(12) United States Patent
Du et al.

(10) Patent No.: US 9,582,221 B2
(45) Date of Patent: Feb. 28, 2017

(54) VIRTUALIZATION-AWARE DATA LOCALITY IN DISTRIBUTED DATA PROCESSING

(71) Applicant: VMware, Inc., Palo Alto, CA (US)

(72) Inventors: Junping Du, Beijing (CN); Ying He, Palo Alto, CA (US); Yunshan Lu, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 103 days.

(21) Appl. No.: 13/907,393

(22) Filed: May 31, 2013

(65) Prior Publication Data
US 2014/0059310 A1 Feb. 27, 2014

Related U.S. Application Data

(60) Provisional application No. 61/692,823, filed on Aug. 24, 2012.

(51) Int. Cl.
| | |
|---|---|
| *G06F 3/06* | (2006.01) |
| *G06F 9/455* | (2006.01) |
| *G06F 9/50* | (2006.01) |
| *G06F 11/20* | (2006.01) |
| *G06F 17/30* | (2006.01) |
| *G06F 11/14* | (2006.01) |

(52) U.S. Cl.
CPC ............ *G06F 3/065* (2013.01); *G06F 3/0604* (2013.01); *G06F 3/067* (2013.01); *G06F 9/45558* (2013.01); *G06F 9/5083* (2013.01); *G06F 11/2094* (2013.01); *G06F 17/30235* (2013.01); *G06F 11/1484* (2013.01); *G06F 2009/45579* (2013.01)

(58) Field of Classification Search
None
See application file for complete search history.

(56) References Cited

U.S. PATENT DOCUMENTS

2012/0130950 A1* 5/2012 Jain et al. .................... 707/634

OTHER PUBLICATIONS

"Rack-aware Replica Placement", Nov. 17, 2006 available at https://issues.apache.org/jira/browse/HADOOP-692.*
"Apache Hadoop", Aug. 11, 2012, https://en.wikipedia.org/wiki/Apache_Hadoop as archived by www.archive.org.*
Junping Du, Mark Pollack, "Enhancements to support different failure and locality topologies", Jun. 4, 2012, 7 pages, available at https://issues.apache.org/jira/browse/HADOOP-8468.

(Continued)

*Primary Examiner* — Daniel Tsui
(74) *Attorney, Agent, or Firm* — Patterson & Sheridan LLP

(57) ABSTRACT

A virtualized computing system for executing a distributed computing application, such as Hadoop, is discussed. The virtualized computing system stores data in a distributed filesystem, such as Hadoop Distributed File System, and processes data using a topology awareness that takes into account the virtualization layer of the virtualized computing system. The virtualized computing system employs locality-related policies, including replica placement policies, replica choosing policies, balancer policies, and task scheduling policies that take advantage of the awareness of the virtualization topology.

20 Claims, 8 Drawing Sheets

(56) References Cited

OTHER PUBLICATIONS

Junping Du, "Hadoop Virtualization Extensions (HVE) User Guide", Oct. 30, 2012, 6 pages, available at https://issues.apache.org/jira/browse/HADOOP-8468.

VMware, Inc. Hadoop Virtualization Extensions on VMware vSphere® 5, Oct. 17, 2012, 20 pages, available at http://serengeti.cloudfoundry.com/pdf/Hadoop%20Virtualization%20Extensions%20on%20VMware%20vSphere%205.pdf.

* cited by examiner

VIRTUALIZATION-AWARE DATA LOCALITY IN DISTRIBUTED DATA PROCESSING

CROSS-REFERENCE TO RELATED APPLICATION(S)

This application claims the benefit of U.S. Provisional Patent Application No. 61/692,823 filed Aug. 24, 2012, the entire contents of which are incorporated by reference herein.

BACKGROUND

Distributed computing platforms, such as Hadoop or other MapReduce-related frameworks, include software that allocates computing tasks across a group, or "cluster," of distributed software components executed by a plurality of computing devices, enabling large workloads (e.g., data sets) to be processed in parallel and more quickly than is generally feasible with a single software instance or a single device. Such distributed computing platforms typically utilize a distributed file system that can support input/output-intensive distributed software components running on a large quantity (e.g., on the order of thousands) of computing devices to access a large quantity (e.g., petabytes) of data. For example, a data set to be analyzed by Hadoop may be stored within a Hadoop Distributed File System (HDFS) that is typically used in conjunction with Hadoop, which enables various computing devices running Hadoop software to simultaneously process different portions of the file.

SUMMARY

One or more embodiments disclosed herein provide a method for storing data in a virtualized computing system comprising a plurality of virtual machines executing on a plurality of host computers arranged in a plurality of interconnected racks. The method includes storing a first replica of a data block at a first node executing in a first virtual machine (VM) and associated with a first node group. The first node group includes a plurality of virtual machines (VMs) that includes the first VM executing on a same first host computer. The method further includes determining a second node for storing a second replica of the data block based on the first node group of the first node. The second node may be associated with a second node group different from the first node group. The method includes storing the second replica of the data block at the determined second node.

One or more embodiments disclosed herein further provide a method for processing data in a distributed computing system having a plurality of virtual machines executing on a plurality of host computers arranged in a plurality of racks. The method includes dividing an input data set into a plurality of data blocks, and storing the plurality of data blocks in a first plurality of nodes executing in a plurality of virtual machines (VMs). Each of the first plurality of nodes may be associated with a node group comprising one or more of the plurality of VMs executing on a same host computer. The method further includes generating a plurality of tasks to process the plurality of data blocks in parallel. A first task of the plurality of tasks may operate on a corresponding one of the plurality of data blocks. The method includes assigning the plurality of tasks to the second plurality of nodes executing in the plurality of VMs based on a network topology of the plurality of VMs, the plurality of host computers, and the plurality of racks.

Further embodiments of the present disclosure include a non-transitory computer-readable storage medium that includes instructions that enable a processing unit to implement one or more of the methods set forth above or the functions of the computer system set forth above.

DETAILED DESCRIPTION

Figure 1:
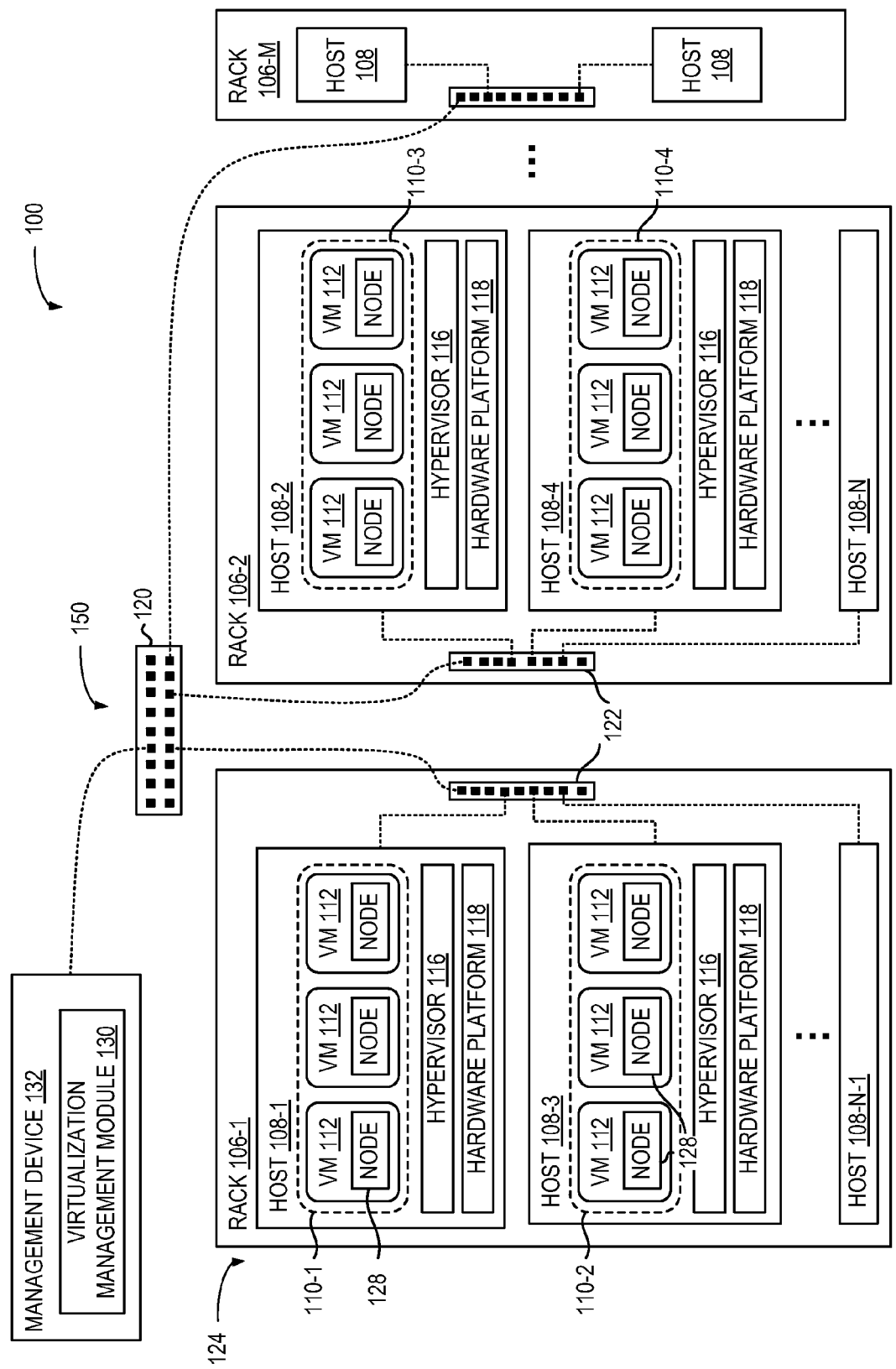
FIG. 1 is a block diagram that illustrates a virtualized computing system with which one or more embodiments of the present disclosure may be utilized.

FIG. 1 is a block diagram that illustrates a computing system 100 with which one or more embodiments of the present disclosure may be utilized. As illustrated, computing system 100 includes a plurality of host computers (identified as hosts 108-1, 108-2, 108-3, 108-4, . . . 108-N) and referred to collectively as hosts 108. Hosts 108 may be arranged in a plurality of racks 106 (identified as racks 106-1, 106-2). In one embodiment, hosts 108 disposed in a same rack 106 are communicatively coupled to a common rack switch 122, and rack switches 122 are communicatively coupled via a data center switch 120 to form a network 150.

Each host 108 is configured to provide a virtualization layer that abstracts processor, memory, storage, and networking resources of a hardware platform 118 into multiple virtual machines (VMs) 112 that run concurrently on the same host 108. The VMs 112 run on top of a software interface layer, referred to herein as a hypervisor 116, that enables sharing of the hardware resources of host 108 by the VMs 112. One example of hypervisor 116 that may be used in an embodiment described herein is a VMware ESXi hypervisor provided as part of the VMware vSphere solution made commercially available from VMware, Inc.

In one embodiment, computing system 100 includes a virtualization management module 130 that may communicate to the plurality of hosts 108 via network 150. In one embodiment, virtualization management module 130 is a computer program that resides and executes in a central server, such as a management device 132 residing in computing system 100, or alternatively, running as a VM in one of hosts 108. One example of a virtualization management module 130 is the vCenter® Server product made available from VMware, Inc. Virtualization management module 130 is configured to carry out administrative tasks for the computing system 100, including managing hosts 108, managing VMs running within each host 108, provisioning VMs, migrating VMs from one host to another host, and load balancing between hosts 108. In one embodiment, virtualization management module 130 is configured to communicate with hosts 108 to collect performance data and generate performance metrics (e.g., counters, statistics) related to availability, status, and performance of hosts 108 and VMs 112.

In one embodiment, computing system 100 supports execution of a distributed computing application 124 configured to perform large-scale processing and analysis of data using a plurality of nodes 128 working in parallel. In the embodiment shown, VMs 112 may be configured to serve as nodes 128 generated and managed by distributed computing application 124 that distributes a workload over the nodes. In one embodiment, nodes 128 may be organized in a plurality of node groups 110 (identified as node group 110-1, 110-2, 110-3, 110-4) such that nodes 128 executing on a same host 108 are members of the same node group 110. VMs 112 executing as nodes 128 on host 108 are shown in greater detail in FIG. 2.

Figure 2:
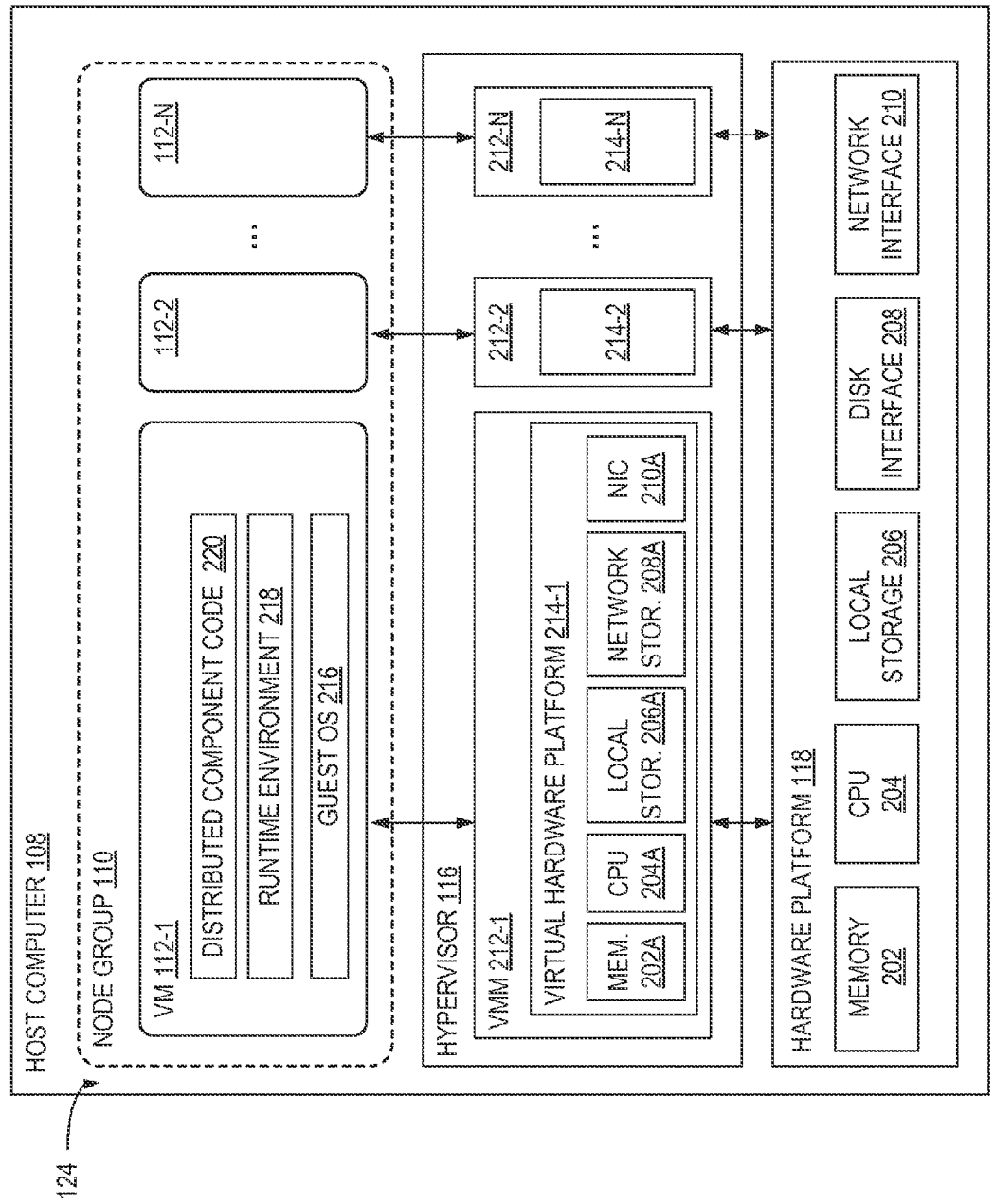
FIG. 2 is a block diagram that illustrates a host computer supporting one or more virtual machines, according to one embodiment of the present disclosure.

FIG. 2 is a block diagram that illustrates a host computer 108 supporting one or more virtual machines 112 that may serve as nodes of a distributed computing application 124, according to one embodiment of the present disclosure. As shown, hardware platform 118 of each host 108 may include conventional components of a computing device, such as a memory 202, a processor 204, local storage 206, a storage interface 208, and a network interface 210. Local storage 206 may include, for example, one or more hard disks, flash memory modules, solid state disks, and optical disks. Storage interface 208 enables host 108 to communicate with one or more network data storage systems that may, for example, store "virtual disks" that are accessed by VM nodes. Examples of storage interface 208 are a host bus adapter (HBA) that couples host 108 to a storage area network (SAN) or a network file system interface. Network interface 210 enables host 108 to communicate with another device via a communication medium, such as via rack switches 122 of network 150. An example of network interface 210 is a network adapter, also referred to as a Network Interface Card (NIC). In some embodiments, a plurality of NICs is included in network interface 210.

As described earlier, virtual machines (e.g., VMs 112-1 to 112-N) run on top of a hypervisor 116 that enables sharing of the resources of hardware platform 118 of host 108 by the virtual machines. Hypervisor 116 may run on top of the operating system of host 108 or directly on hardware components of host 108. Hypervisor 116 provides a device driver layer configured to map physical resource of hardware platforms 118 to "virtual" resources of each VM 112 such that each VM 112-1 to 112-N has its own corresponding virtual hardware platform (e.g., a corresponding one of virtual hardware platforms 214-1 to 214-N). Each such virtual hardware platform 214 provides emulated hardware (e.g., memory 202A, processor 204A, local storage 206A, networked storage 208A, network interface 210A, etc.) that may, for example, function as an equivalent, conventional hardware architecture for its corresponding VM 112. Virtual hardware platforms 214-1 to 214-N may be considered part of virtual machine monitors (VMMs) 212-1 to 212-N which implement virtual system support to coordinate operations between hypervisor 116 and corresponding VMs 112-1 to 112-N.

In the embodiment depicted in FIG. 2, each VM 112 includes a guest operating system (OS) 216 (e.g., Microsoft Windows, Linux) and one or more guest applications running on top of guest OS 216. In one embodiment, each VM 112 includes a runtime environment 218, such as a Java Virtual Machine (JVM), that supports execution of a distributed software component code 220 (e.g., Java code) for distributed computing application 124. In some embodiments, distributed software component code 220 may implement functionality of "data nodes", for storing data distributed across virtualized computing system 100, and functionality of "compute nodes" for processing the distributed data, described further below.

For example, if distributed computing application 124 is a Hadoop application, a VM 112 may have a runtime environment 218 (e.g., JVM) that executes distributed software component code 220 implementing at least one of a Job Tracker" function, "TaskTracker" function, "Name Node" function, and "Data Node" function. In another embodiment of distributed computing application 124 having a next-generation Hadoop data-processing framework (e.g., YARN), a VM 112 may have a runtime environment 218 (e.g., JVM) that executes distributed software component code 220 implementing a "Resource Manager" function (which includes a workload scheduler function), "Node Manager" function, "Task Container" function, "Application Master" function, "Name Node" function, "Data Node" function, and "Journal Node" function. Alternatively, each VM 112 may include distributed software component code 220 for distributed computing application 124 configured to run natively on top of guest OS 216. An example Hadoop application is depicted in FIG. 3.

Example Hadoop Application in Virtualized Environment

Figure 3:
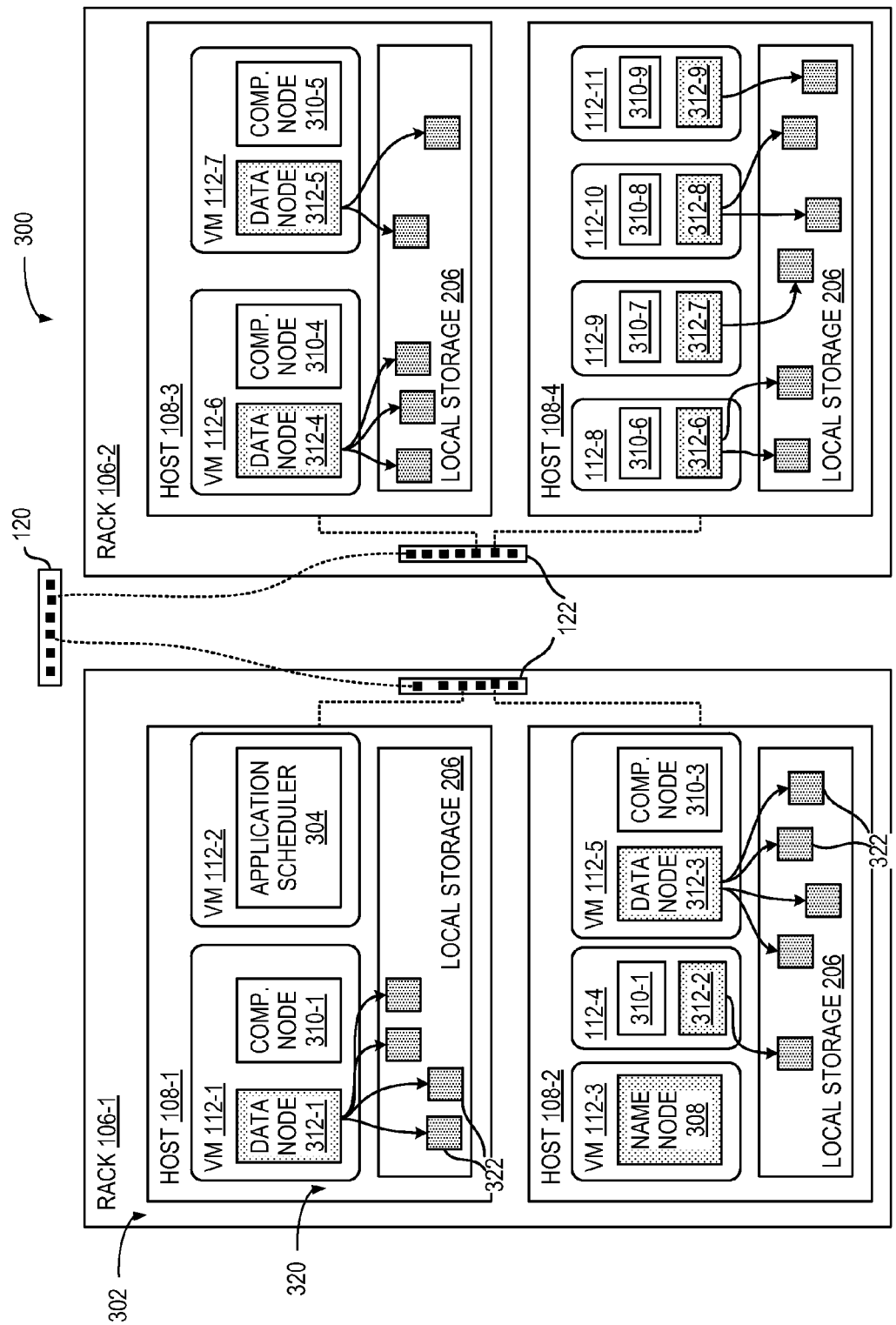
FIG. 3 is a block diagram that illustrates a virtualized computing system executing a distributed computing application, according to one embodiment of the present disclosure.

FIG. 3 is a block diagram that illustrates a virtualized computing system 300 executing a distributed computing application, according to one embodiment of the present disclosure. Virtualized computing system 300 may be similar to virtualized computing system 100, including having a plurality of host computers (e.g., 108-1, 108-2, 108-3, 108-4) arranged in a plurality of racks 106-1, 106-2). In the embodiment shown in FIG. 3, the distributed computing application is a Hadoop application 302 configured to process a large set of data using a distributed set of nodes (e.g., VMs 112) allocated to Hadoop application 302. It should be recognized that alternative architectures, such as YARN (Yet Another Resource Negotiator) and other MapReduce-related architectures, may be utilized with the techniques described herein. It should be further recognized that, while embodiments of present disclosure are described in terms of a Hadoop installation, other distributed computing applications may be configured and utilized according to the techniques provided herein.

In one embodiment, Hadoop application 302 includes an application scheduler 304 (e.g., executing in a VM) which accepts jobs from clients and schedules corresponding workloads for execution on a plurality of compute nodes 310 (e.g., 310-1, 310-2, 310-3, . . . 310-9) that are part of Hadoop application 302. In some implementations of Hadoop, application scheduler 304 may be referred to as a "JobTracker" node or a "ResourceManager" node. Each compute node 310, which may be executing in a VM 112, is a worker node that carries out tasks (e.g., map tasks, reduce tasks of a MapReduce job) provided by application scheduler 304. Each compute node 310 may handle multiple tasks in parallel. In some implementations of Hadoop, compute nodes 310 may be referred to as "TaskTracker" nodes or "NodeManager" nodes.

In one embodiment, Hadoop application 302 includes a Name Node 308 (e.g., executing as a VM) that implements a distributed filesystem 320 configured to store and access data files in a distributed manner across a plurality of nodes, referred to herein as data nodes 312 (e.g., 312-1, 312-2, 312-3, . . . 312-9). A file stored in distributed filesystem 320 is split into one or more data blocks 322, and data blocks 322 are stored in a set of data nodes 312. Each data node 312 uses and manages a local data store (e.g., local storage 206) to store data blocks 322 used by Hadoop application 302. In one embodiment, name node 308 determines mappings of blocks to data nodes 312. Data nodes 312 are configured to serve read and write requests from clients of distributed filesystem 320. Data nodes 312 may be further configured to perform block creation, deletion, and replication, upon instruction from name node 308.

In some embodiments, a "primary" virtual disk accessed by a VM 112 is represented by emulated local storage 206A and implemented as a file stored in local storage 206 of hardware platform 118. One example of a format for a virtual disk file is the ".vmdk" file format developed by VMware although it should be recognized that any virtual disk file format may be utilized consistent with the teachings herein. Such a primary virtual disk, which may be referred to as a boot disk, includes guest OS 216, runtime environment 218, and distributed software component code 220. In such an embodiment, Data Node components of worker VM nodes may store (and access) HDFS data blocks 322 within the primary virtual disk (i.e., emulated local storage 206A) itself (e.g., where HDFS operates on top of the file system of guest OS 216 and for example, stores HDFS data blocks 322 as files within a folder of the file system of guest OS 216).

When application scheduler 304 receives a request to execute a job within Hadoop application 302, application scheduler 304 may determine what resources should be considered as available for executing the requested job and the availability of those resources on a per-host basis. In one embodiment, application scheduler 304 uses information from name node 308 to determine where data blocks are located within distributed nodes of Hadoop application 302 (e.g., data nodes 312), and information from the plurality of compute nodes 310 to determine what resources are available for running the job.

Conventional implementations of distributed computing applications (e.g., Hadoop application) work under an assumption of a dedicated set of physical computing elements (e.g., physical machines) being used as nodes. However, such a distributing computing application may face challenges when attempting executing within a virtualized environment, as depicted in FIG. 1, where nodes are in fact virtual machines executing in physical hosts. For example, application scheduler 304 may accept jobs (e.g., from a user) for execution by distributed computing application 124 within the virtualized environment of computing system 100. The input data set of a received job is stored within distributed filesystem 320 and distributed across data nodes 312 based on replica placement policies. Placement policies typically factor in data locality and failure groups, for example, to provide fault tolerance and reliability. However, typical replica placement policies do not factor in a virtualization level included in a virtualized environment. For example, distributed filesystem 320 may store different replicas of a data block on VMs that are executing on the same physical host, which means both replicas are subject to the same failure if the physical host fails.

Furthermore, application scheduler 304 may schedule execution a received job within VM nodes 128 by splitting the job into small tasks and distributing the tasks, a process sometimes referred to as task placement, on compute nodes 310 based on a scheduling or placement policy. Scheduling and placement policies typically factor in data locality. However, the task scheduling and placement policies do not factor in a virtualization level included in a virtualized environment.

Accordingly, embodiments of the present disclosure provide a distributed computing application 124 configured to be virtualization-aware, such that placement and scheduling decisions made by distributed computing application 124 take into account topology of nodes as virtual machines, the host computers on which they execute. In one embodiment, distributed computing application 124 includes a "node group" layer into a network topology having "nodes" and "racks" and performs data block replica placement (i.e., writes), replica choosing (i.e., reads), block balancing, task scheduling, and other functions based on the revised network topology.

Figure 4:
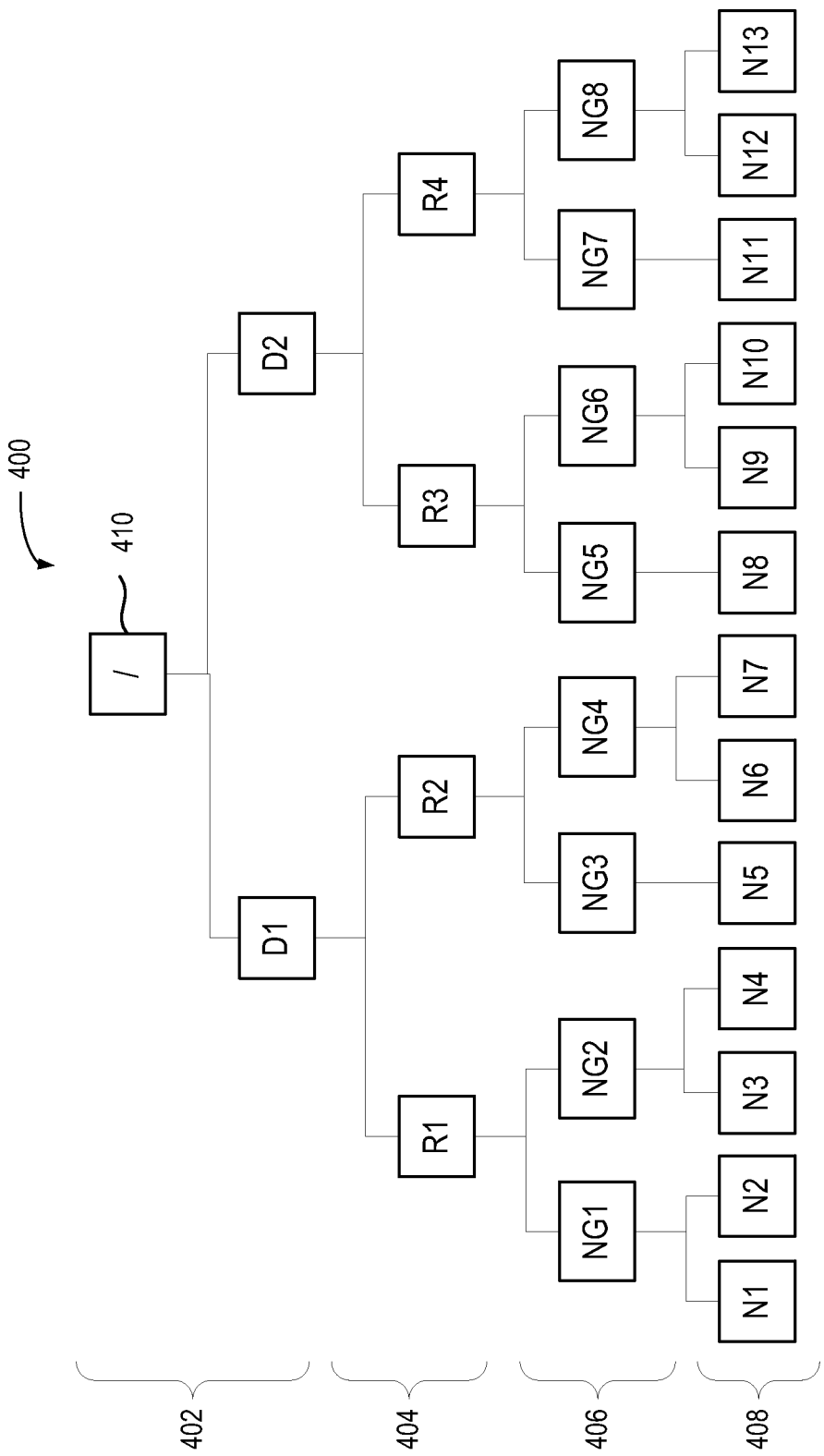
FIG. 4 is a schematic diagram that illustrates a network topology for the virtualized computing system, according to one embodiment of the present disclosure.

FIG. 4 is a schematic diagram that illustrates a network topology 400 that may be used as the basis for the architecture for the virtualized computing system 100, according to one embodiment of the present disclosure. In one embodiment, network topology 400 is a hierarchical topology having at least four levels 402, 404, 406, 408. Network topology 400 may represent a cluster comprised of data centers having racks of computers that execute virtual machines. Network topology 400 includes a root node 410 that represents an entire cluster on which a Hadoop application is executing. A first level 402 represents one or more data centers (identified as D1 and D2), where each data center includes one or more racks interconnected by switches (e.g., racks 106), which are represented by a second level 404. A third level 406 comprises a plurality of node groups 110 (e.g., NG1, NG2, NG3, . . . NG8) that represents a hypervisor layer of the virtualized computing system 100. A fourth level 408 represents a plurality of nodes 128 (e.g., N1, N2, N3, . . . N13) where data and compute processing occurs, and in the virtualized computing system 100, are embodied by VMs 112 executing on physical hosts 108. In one embodiment, all VMs 112 under a same node group 110 run on a same physical host 108. For example, nodes N1 and N1 are members of the same node group NG1 and may be embodied as data nodes 312 executing within different VMs 112 on a same host computer 108-2.

Virtualization-Aware Replica Placement Policy

Figure 5:
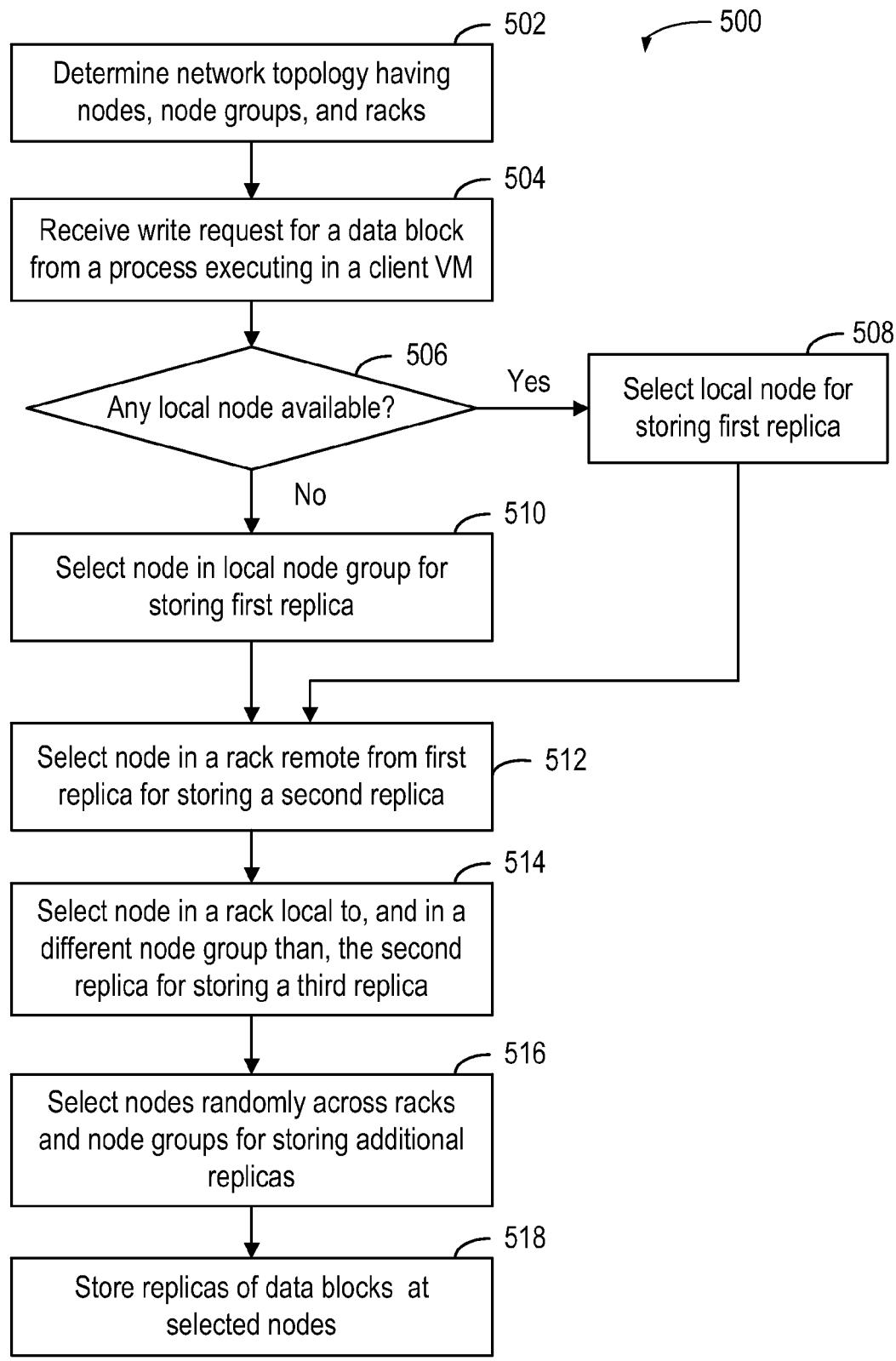
FIG. 5 is a flow diagram that illustrates steps for a method of storing data in a distributed file system within the virtualized computing system, according to an embodiment of the present disclosure.

FIG. 5 is a flow diagram that illustrates steps for a method 500 of storing data in a distributed filesystem within the virtualized computing system, according to an embodiment of the present disclosure. It should be recognized that, even though the method 500 is described in conjunction with the system of FIGS. 1-3, any system configured to perform the method steps is within the scope of embodiments of the disclosure. Further, discussion of method 500 may refer by way of example to FIG. 6, which is a block diagram illustrating an example of placing replicas of data blocks in a virtualized computing system 600 using a virtualization-aware replica placement policy, according to embodiments of the present disclosure.

The method 500 begins at step 502, where distributed filesystem 320 determines a network topology having nodes 128, node groups 110, and racks 106. Distributed filesystem 320 may generate a mapping of data nodes 312 to associated node groups 110 and racks 106 based on a user-provided configuration file. In one embodiment, during startup and initialization, name node 308 executes a topology awareness script that provides a mapping between a network address of a node 128 executing within a VM 112 to a position of the node within the network topology (e.g., network topology 400). In some embodiments, the position of a node within network topology 400 may be represented by a string value that includes rack, node group, and node information. In one implementation, the position of the node within the network topology may be specified using a syntax similar to a file name, having a format such as: /<DataCenter>/<Rack>/<NodeGroup>/<Node>.

For example, the virtualized computing system 300 shown in FIG. 3 includes two racks 106-1 and 106-2 (named herein as Rack1 and Rack2), where Rack1 include two physical hosts 108-1 and 108-2 (named as NodeGroup1 and NodeGroup2) and Rack2 includes two physical hosts 108-3 and 108-4 (named NodeGroup3 and NodeGroup4). The virtualized computing system further includes nine VMs executing as nodes 312-1 to 312-9 with IP addresses from 192.168.1.1 to 192.168.1.9, respectively. An example topology script having a mapping of network address to topology position is shown in Table 1 below.

TABLE 1

Example Topology Script

| | |
|---|---|
| 192.168.1.1 | /rack1/nodegroup1 |
| 192.168.1.2 | /rack1/nodegroup2 |
| 192.168.1.3 | /rack1/nodegroup2 |
| 192.168.1.4 | /rack1/nodegroup3 |
| 192.168.1.5 | /rack1/nodegroup3 |
| 192.168.1.6 | /rack2/nodegroup4 |
| 192.168.1.7 | /rack2/nodegroup4 |
| 192.168.1.8 | /rack2/nodegroup4 |
| 192.168.1.9 | /rack2/nodegroup4 |

In other embodiments, rack information and node group information may be determined by automatic topology awareness using neighbor device discovery protocols, such as IEEE 802.1AB Link Layer Discovery Protocol (LLDP) or Cisco Discovery Protocol (CDP), e.g., by techniques disclosed in U.S. patent application Ser. No. 13/407,895, filed on Feb. 29, 2012 and entitled "Provisioning of Distributed Computing Clusters," which is incorporated by reference herein in its entirety. Such discovery protocols enable a network device to advertise information about themselves to other devices on the network. In some embodiments, hypervisors 116 may include a network component (e.g., vSwitch) that connects to each of the plurality of nodes 128 and is configured to support such neighbor device discovery protocols. In such embodiments, distributed filesystem 320 can be configured to obtain physical switch information (e.g., Device IDs) from each network component (e.g., vSwitches) to which each node is connected and determine rack and node group information based on the Device IDs.

At step 504, distributed filesystem 320 receives a write request for a data block from a process executing in a client VM. In some embodiments, the process executing in the client VM may be an HDFS access client or compute node 310 in a Hadoop application. In some embodiments, the write request may be for the creation of a new file comprised of a plurality of data blocks, such as during the import of a new input dataset. In other embodiments, the write request may be from a compute node for modification of existing files, such as during processing of a Hadoop job. As described earlier, distributed filesystem 320 may be configured to replicate data blocks of a file for fault tolerance. The amount of replication used may be configured per file according to a replication factor. For example, distributed filesystem 320 may persist a data block using at least three replicas according to a replication factor of at least 3. In one embodiment, distributed filesystem 320 distributes three replicas of the data block across the plurality of data nodes 312 according to a virtualization-aware replica placement policy that takes into account the node groups of data nodes 312.

At step 506, name node 308 of the distributed filesystem determines whether any local node is available for storing a first replica of the data block. In one embodiment, a "local node" refers to a node located at a same network address as another node (e.g., the client VM that issued the write request). For example, the local node may be a data node 312 executing on the same VM (and therefore located at a same network address) as an HDFS client that issued the write request. If available, at step 508, distributed filesystem 320 selects the local node for storing the first replica. If no local nodes are available (e.g., crashed, network down, not deployed), at step 510, distributed filesystem 320 selects from the local node group for storing the first replica. A "local node group" refers to one or more nodes that are members of the same node group, and therefore, may be VMs executing on the same physical host computer. As such, in one embodiment, distributed filesystem 320 selects a node having a same node group as the writer client for storing the first replica.

Figure 6:
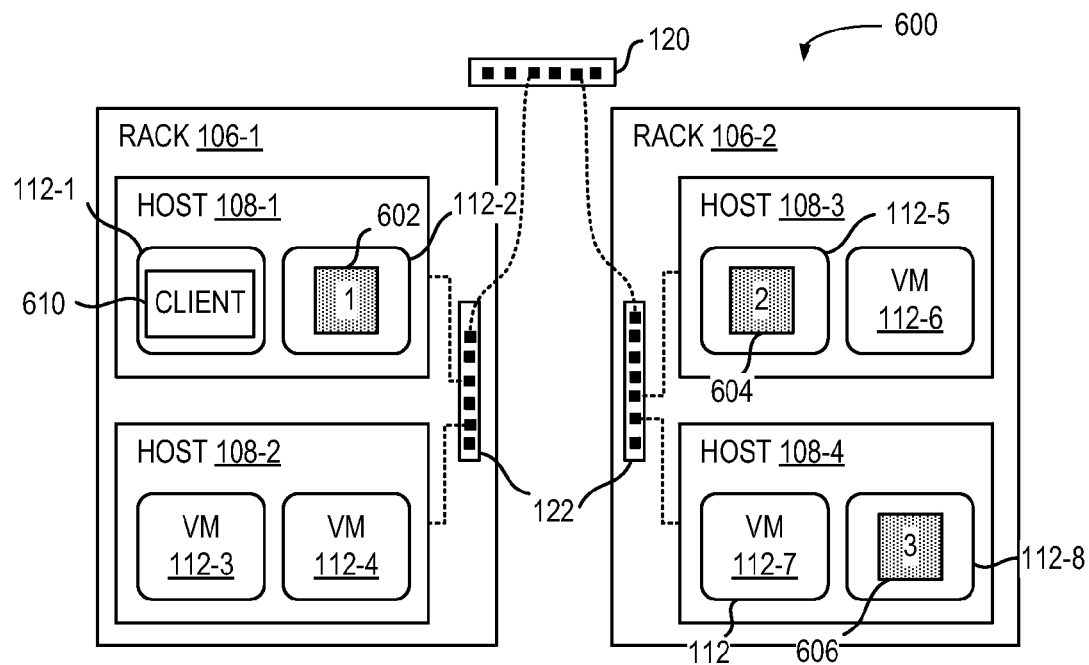
FIG. 6 is a block diagram illustrating a technique for placing replicas of data blocks in virtual machines of the virtualized computing system, according to embodiments of the present disclosure.

For example, as shown in FIG. 6, assuming a write request is received from an HDFS client 610 (e.g., a compute node 310) executing within VM 112-1, distributed filesystem 320 may store a first replica 602 of the data block at a local node (e.g., VM 112-1) or one of the nodes (e.g., VM 112-2) under the same node group of the writing client 610. In this example, the VM 112-1 and VM 112-2 are executing on the same host computer 108-1 and therefore are members of the same node group. Accordingly, embodiment of the present disclosure provide a replica placement policy using a same or better network bandwidth requirements as when running in non-virtualized environments, as the network between VMs on a same physical host may have higher throughput, lower latency, and does not consume any physical switch bandwidth (e.g., of rack switches 122).

In one embodiment, name node 308 may employ a general restriction that no duplicated replicas may be on the same node or nodes under the same node group. Referring back to FIG. 5, at step 512, to store a second replica of the data block, name node 308 of the distributed filesystem selects a node in a rack remote from the first replica. At step 514, to store a third replica of the data block, name node 308 of the distributed filesystem selects a node in a rack local to and in a different node group than the second replica. In one embodiment, name node 308 determines a node for storing a third replica, where the node is associated with a node group different than the node group of the data node where the second replica is stored.

In the example shown in FIG. 6, distributed filesystem 320 stores a second replica 604 of the data block in a node (e.g., VM 112-5) located in a different rack 106-2 than the location of the first replica 602 (e.g., stored in rack 106-1). Distributed filesystem 320 further stores a third replica 606 of the data block in a node (e.g., VM 112-8) located in a same rack 106-2 as the second replica 604, but in a different node group (e.g., host 108-4) as the second replica 604. Accordingly, embodiments of the present disclosure provide a replica placement policy that preserves reliability properties as when running in non-virtualized environments. It should be recognized that VMs on the same physical host can be affected by the same hardware failure. As such, while conventional Hadoop implementation unaware that nodes are actually VMs might place second and third replicas on nodes that are VMs on the same host (e.g., VMs 112-7 and 112-8), embodiments of the present disclosure enable replication of data across two different VMs on the same host to be avoided.

Referring back to FIG. 5, at step 516, distributed filesystem 320 selects nodes randomly across racks and node groups for storing additional replicas. In one embodiment, for replication factors beyond three (i.e., more than three replicas requested), name node 308 selects nodes randomly across a plurality of available nodes in racks and node groups to satisfy the remaining number of requested replicas and some balancing restrictions. For example, additional replicas may be stored at random nodes with a restriction no more than two replicas be placed in the same rack, if there are enough racks. In another example, additional replicas may be stored at random nodes with a restriction that no duplicated replicas should be on the same node or nodes under the same node group.

At step 518, distributed filesystem 320 stores replicas of the data block at the selected nodes. In one embodiment, the replicas of the data block may be written directly to the selected nodes by the requesting client. In other embodiments, replicas of the data block may be pipelined to the selected nodes. For example, the writer process executing in the client VM obtains a list of the selected data nodes from name node 308. The writer process flushes the data block to the first data node on the list. The first data node starts receiving the data in small portions, writing portions to local storage, and transfers the portions to the second data node in the list. Similarly, the second data node may transfer portions of the data block to a third data node on the list, and so on, until all data nodes on the list have replicas of the data block.

While the virtualization-aware replica placement policy described in method 500 is discussed in relation to initial replica placement of data blocks of a file, it should be recognized that the virtualization-aware replica placement policy may be applied in other situations where placement of replicas are determined, such as when data blocks are re-replicated. In one embodiment, replicas are placed according to a virtualization-aware placement policy during data blocks re-replication when, for example, a data node may become unavailable, a particular replica may become corrupted, local storage 206 for a data node may fail, or the replication factor of a file may be increased.

Virtualization-Aware Replica Choosing Policy

Figure 7:
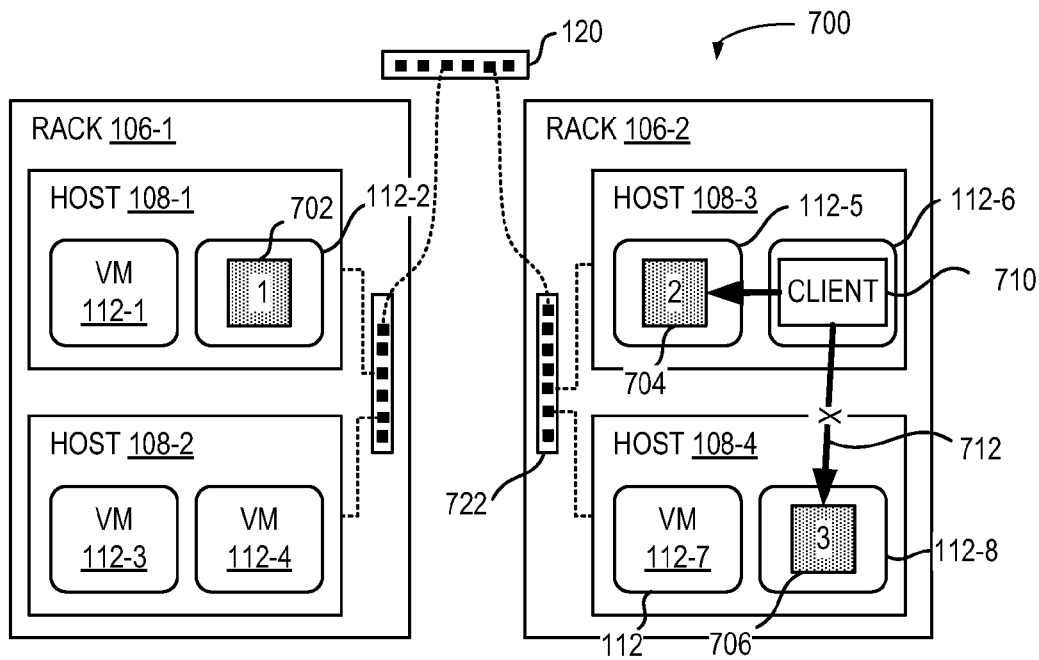
FIG. 7 is a block diagram illustrating a technique for choosing replicas of data blocks stored at virtual machines of the virtualized computing system, according to embodiments of the present disclosure.

FIG. 7 is a block diagram illustrating a technique for choosing replicas of data blocks stored at VMs (VMs 112-1 to 112-8) of a virtualized computing system 700, according to embodiments of the present disclosure. In response to read requests for a data block (or a file comprised of data blocks) from an HDFS client 710, distributed filesystem 320 may choose one replica from the plurality of replicas of the data block stored in the distributed filesystem according to a virtualization-aware replica choosing policy. In one embodiment, the virtualization-aware replica choosing policy includes an order of preference that specifies replicas located in the same node group are preferred over replicas located in the same rack, which are referred over replicas located in remote racks. In one embodiment, virtualization-aware replica choosing policy may be implemented by determining distances between nodes.

In one embodiment, name node 308 of the distributed filesystem determines distances between the reader and each of the replicas of the requested data block and tries to satisfy the read request with a replica that is "nearest" to the reader (e.g., client 710). In some embodiments, name node 308 determines the distances based on a position of the reader and based on the position of a particular replica within network topology 400 having racks, node groups, and nodes. Distances between nodes (e.g., replica and reader) may include values representing, from nearest to farthest, local nodes, e.g., executing on the same VM 112; local node group, e.g., members of the same node group; local rack, e.g., members of the same rack, and off-rack, e.g., members of different racks. In one implementation, distances between nodes may include numeric values representing local node (0), local node group (2), local rack (4), and off rack (6), where a greater numeric value represents a farther distance.

In the example shown in FIG. 7, name node 308 of the distributed filesystem receives a read request from a client 710 (e.g., a process executing in a compute node on VM 112-6) for a data block having replicas 702, 704, 706 stored at data nodes at VM 112-2, 112-5, and 112-9 respectively. Name node 308 determines a distance between the compute node on VM 112-6 and each of the replicas at VMs 112-2, 112-5, and 112-9. In this example, replica 702 has a distance value of 6 because the replica is located off-rack. Replica 704 has a distance value of 2 because replica 704 is stored at a data node (e.g., VM 112-5) executing on the same host computer 108-3 as client 710 and therefore is from a local node group. Replica 706 has a distance value of 4 because replica 706 is stored at a data node (e.g., VM 112-8) located on the same rack as client 710.

Accordingly, using a replica choosing policy based on shortest distance, client 710 accesses replica 704 located at VM 112-5 to obtain a copy of the requested data block. In contrast, conventional techniques for replica choosing may have chosen replica 706 for merely being located at another node on the same rack 106-2 (depicted by arrow 712), and client 710 would incur network bandwidth and latency for data to be transferred from host 108-4 through rack switch 722 to host 108-3. As such, embodiments of the present disclosure enable the distributed filesystem to make the better choice that reduces network bandwidth (as data transfer from within host 108-3 need not incur additional network traffic on rack switch 722) and lowers latency (as communication between VMs on the same physical host may be faster than communication between VMs across hosts).

Virtualization-Aware Balancing Policy

Figure 8:
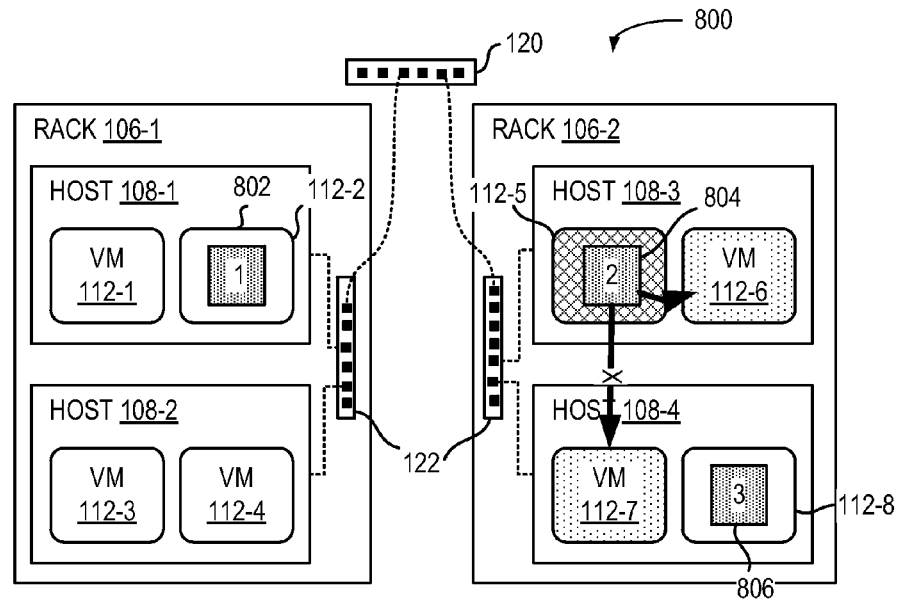
FIG. 8 is a block diagram illustrating a technique for balancing storage of data blocks across virtual machines of the virtualized computing system, according to embodiments of the present disclosure.

FIG. 8 is a block diagram illustrating a technique for balancing storage of data blocks across VMs (VMs 112-1 to 112-8) of a virtualized computing system 800, according to embodiments of the present disclosure. Distributed filesystem 320 may utilize rebalancing to automatically move data blocks from over-utilized data nodes to under-utilized data nodes. In one example, name node 308 may determine a data node is over-utilized or under-utilized if free space on the data node falls below or rises above, respectively, a predetermined threshold value.

According to one embodiment, at the node level, distributed filesystem 320 may choose pairs of source nodes and target nodes for rebalancing based on a virtualization-aware balancing policy. In one embodiment, the virtualization-aware balancing policy may specify an order of preference that prefers source and target nodes in a local node group over source and target nodes in a local rack over source and target nodes in remote racks. In one embodiment, virtualization-aware balancing policy may be implemented by determining distances between nodes, using a similar heuristic as replica choosing policy described above. In one embodiment, name node 308 of the distributed filesystem determines distances between an over-utilized data node (source node) to each of a plurality of under-utilized data nodes (candidate target nodes) and tries to rebalance storage of a data block to a target node nearest to the source node.

In the example shown in FIG. 8, name node 308 of the distributed filesystem stores replicas 802, 804, 806 of a data block at data nodes at VMs 112-2, 112-5, and 112-9, respectively. Name node 308 detects the data node at VM 112-5 is over-utilized and further determines that data nodes at VM 112-6 and 112-7 are under-utilized. Name node 308 determines a distance between the over-utilized node on VM 112-5 and each of the under-utilized nodes at VMs 112-6 and 112-7. In this example, name node 308 selects the source-target node pair comprising the source data node at VM 112-5 and the target data node at VM 112-6 based on a preference for local node group over local rack. In other words, one target data node (e.g., VM 112-6) is executing on the same host computer 108-3 as source node (e.g., VM 112-5) and therefore is from a local node group. As such, name node 308 transfers storage of replica 804 from the source data node at VM 112-5 to the target data node at VM 112-6, and updates metadata such as file block location metadata accordingly.

While FIG. 8 only depicts replicas of a single data block, it should be recognized that name node 308 may choose from any of the plurality of data block replicas stored at the source data node for rebalancing, based on the virtualization-aware balancing policy. In one embodiment, at the block level, name node 308 determines a set of the plurality of data block replicas at a source node eligible for rebalancing, i.e., that may be moved without violating restrictions specified by the replica placement policy, such as the restriction that duplicated replicas should not be stored at nodes of a local node group. As such, a replica data block may not be a good candidate for balancing between a source node and a target node if another replica is on the target node or on the same node group of the target node. For example, assuming the selected target node is the data node at VM 112-7, name node 308 would select a different data block than replica 804 for balancing because another replica 806 of the same data block is already stored on the same node group (e.g., host 108-4) of the target node.

Virtualization-Aware Task Scheduling Policy

According to one embodiment, distributed computing application 124 may perform task scheduling using data locality information that takes into consideration the network topology of nodes, including node groups 110, and benefits from local data access, including different VMs accessing local storage 206 on the same physical host 108. In certain embodiments having a Hadoop application, when a Task Tracker node requests new tasks to fill free task slots, the JobTracker node may select a task from a task list having corresponding data block nearest to the requesting Task Tracker node in the order of: data local, node group local, rack local, and off rack.

Figure 9:
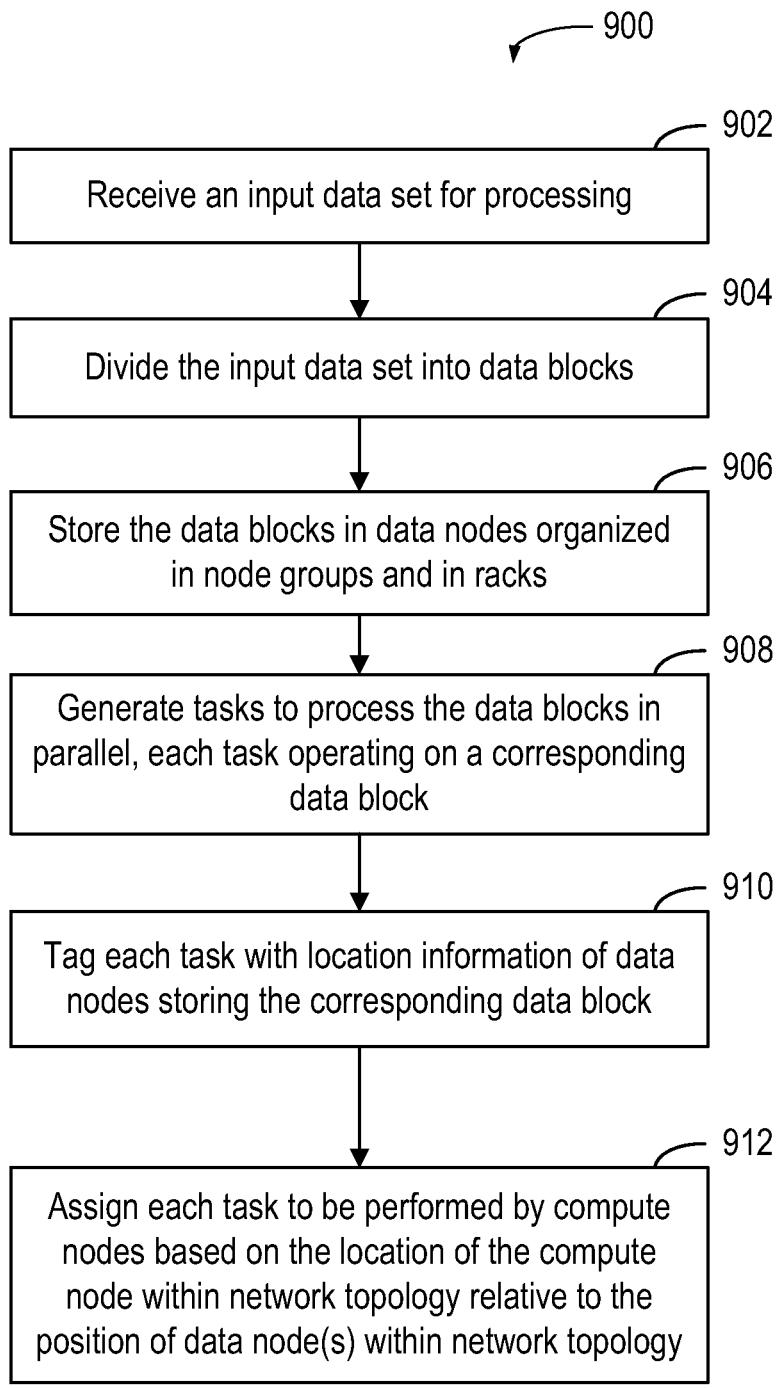
FIG. 9 is a flow diagram that illustrates steps for a method of scheduling tasks based on data locality in a distributed file system within the virtualized computing system, according to an embodiment of the present disclosure.

FIG. 9 is a flow diagram that illustrates steps for a method 900 of scheduling tasks based on data locality in a distributed file system within the virtualized computing system It should be recognized that, even though the method 900 is described in conjunction with the system of FIGS. 1-3, any system configured to perform the method steps is within the scope of embodiments of the disclosure. Further, discussion of method 900 may refer by way of example to FIG. 10, which is a block diagram illustrating a technique for scheduling tasks to be performed on data blocks stored across VMs of a virtualized computing system 1000, according to embodiments of the present disclosure The method 900 begins at step 902, application scheduler 304 of the distributed computing application receives an input data set for processing. At step 904, application scheduler 304 of the distributed computing application divides the input data set into a plurality of data blocks. For example, in some embodiments having a Hadoop application, when a MapReduce job is submitted to application scheduler 304, such as a JobTracker node, application scheduler 304 splits the input data into block-sized pieces.

At step 906, distributed computing application 124 stores the plurality of data blocks in data nodes 312 organized in node groups 110 and in racks 106. In one embodiment, distributed computing application 124 loads the plurality of data blocks into distributed filesystem 320 which stores replicas of the data blocks across data nodes 312 using a virtualized-aware replica placement policy as discussed earlier. In the example shown in FIG. 10, an input dataset is split into data blocks 1002, 1004, 1006 and stored at data nodes 312-3, 312-1, 312-5 at VMs 112-3, 112-1, and 112-5, respectively, in virtualized computing system 1000.

Figure 10:
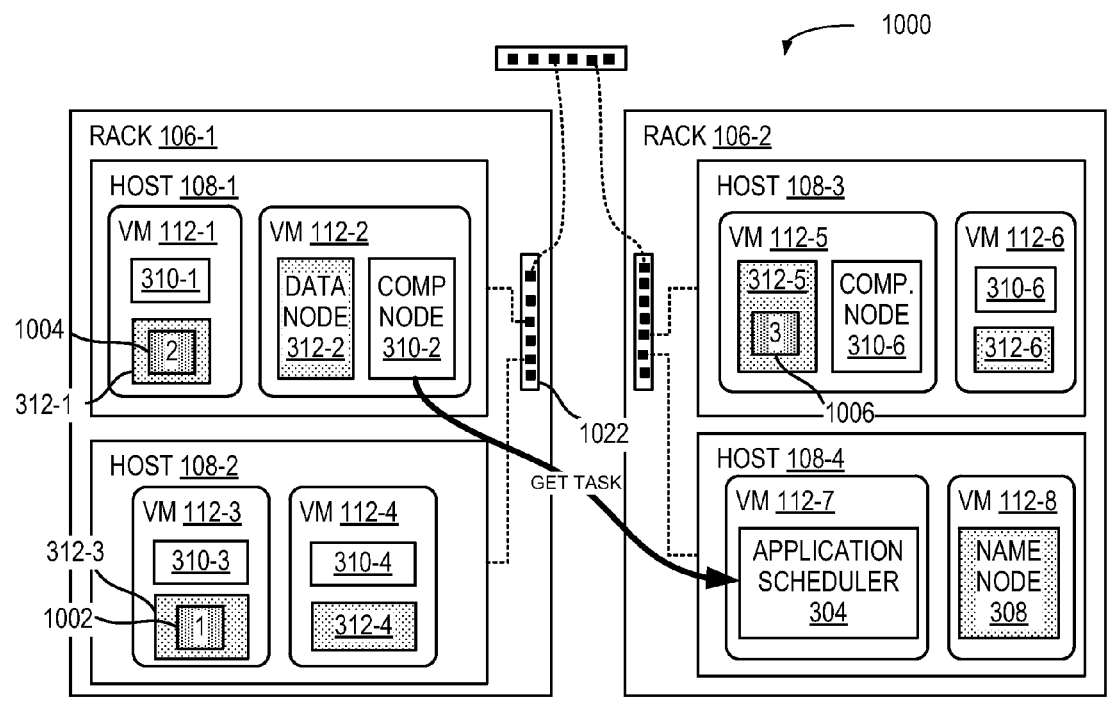
FIG. 10 is a block diagram illustrating a technique for scheduling tasks to be performed on data blocks stored across virtual machines of the virtualized computing system, according to embodiments of the present disclosure.

At step 908, application scheduler 304 generates a plurality of tasks to process the data blocks in parallel. Each task is configured to operate on a corresponding data block. In the example of FIG. 10, application scheduler 304 generates a plurality of tasks configured to operate on a corresponding data blocks 1002, 1004, 1006.

At step 910, application scheduler 304 may tag each tasks with location information of data nodes storing the corresponding data block. In some embodiments, the location information may include a list of data nodes where replicas of the corresponding data block are stored. In one embodiment, the location information for a data node may include a position of the data node within network topology 400, including rack, node group, and node information. In the example of FIG. 10, application scheduler 304 tags a task associated with data block 1002 with location information that includes specifies the data node 312-3 at VM 112-3, the node group associated with host 108-1, and rack 106-1 where data block 1002 is stored.

At step 912, application scheduler 304 assigns each tasks to be performed by compute nodes based on a position of the compute node within the network topology relative to positions of the data nodes (storing the corresponding data block) within the network topology. In one embodiment, each task may be assigned to a compute node based on the location of the compute node relative to the data node, relative to the node group of the data node, and relative to the rack of the data node. In some embodiments, each task may be assigned to a compute node based on virtualization-aware task scheduling policy that specifies an order of preference that includes tasks having local data (e.g., data located at a same VM), then tasks having data in a local node group, then tasks having data stored in a local rack, then tasks having data stored in a remote rack. In one embodiment, virtualization-aware task scheduling policy may be implemented by determining distances between nodes, using a similar distance weighting heuristic as replica choosing policy described above.

In the example of FIG. 10, compute node 310-2 at VM 112-2 has an available task slot and requests new tasks from application scheduler 304. Application scheduler 304 has three task candidates, which work on different data blocks 1002, 1004, 1006, to be scheduled. Application scheduler 304 assigns compute node 310-2 a task corresponding to data block 1004 based on data block 1004 being located at a data node 312-1 which is executing on the same physical host 108-1 as compute node 310-2. In contrast, conventional techniques for task scheduling may have given equal weight or chosen the task corresponding to data block 1004 replica 706 for being located at another node 312-3 on the same rack 106-1, and compute node 310-2 would incur network bandwidth and latency for data to be transferred from host 108-2 through rack switch 1022 to host 108-1. As such, embodiments of the present disclosure enable application scheduler 304 to make a better choice that enjoys physical host level data locality.

While embodiments of the present disclosure provide node groups that support different failure and locality topologies that are associated with virtualization, it should be recognized that techniques described herein may be extended to support other failure and locality topologies, such as those relating to failures of power supplies, arbitrary sets of physical servers, or collections of servers from a same hardware purchase cycle.

Although one or more embodiments of the present disclosure have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

The various embodiments described herein may employ various computer-implemented operations involving data stored in computer systems. For example, these operations may require physical manipulation of physical quantities which usually, though not necessarily, take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the disclosure may be useful machine operations. In addition, one or more embodiments of the disclosure also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the description provided herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like. One or more embodiments of the present disclosure may be implemented as one or more computer programs or as one or more computer program modules embodied in one or more computer readable media. The term computer readable medium refers to any data storage device that can store data which can thereafter be input to a computer system; computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD-ROM (Compact Disc-ROM), a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A method for storing data in a virtualized computing system comprising a plurality of virtual machines executing on a plurality of host computers arranged in a plurality of interconnected racks, the method comprising:

storing a first replica of a data block at a first node executing in a first virtual machine (VM) and associated with a first node group, wherein the first node group comprises a plurality of virtual machines (VMs) that includes the first VM executing on a same first host computer;

determining a second node for storing a second replica of the data block based on the first node group of the first node, wherein the second node is associated with a second node group different from the first node group; and storing the second replica of the data block at the determined second node.

2. The method of claim 1, wherein storing the first replica of the data block at the first node further comprises:

receiving a write request for the data block from a process executing in a client VM, wherein the client VM is part of the plurality of VMs comprising the first node group; and responsive to determining no node local to the client VM is available for storing the data block, selecting the first node for storing the first replica based on the first VM and the client VM are members of the same first node group.

3. The method of claim 1, wherein the second node is executing in a second VM, wherein the second node group comprise a second plurality of VMs that includes the second VM executing on a second host computer different from the first host computer.

4. The method of claim 3, wherein the first host computer is disposed in a first rack, wherein the second host computer is associated with a second rack different from the first rack, wherein the method further comprises:
   determining a third node for storing a third replica of the data block based on the third node executing on a third host computer disposed in the same second rack as the second host computer, and further based on the third node executing on a different host computer than the second node.

5. The method of claim 3, further comprising:
   storing additional replicas of the data block at nodes selected randomly across racks and node groups.

6. The method of claim 1, further comprising:
   receiving a read request for the data block from a process executing in a client VM;
   determining a distance between the client VM and each of a plurality of nodes, including the first node and the second node, that stores a replica of the data block, wherein the distance between the client VM and the first node is determined based on a network topology comprising the first VM on which the first node is executing, the first host computer on which the first VM is executing, and the first rack in which the first host computer is arranged; and
   retrieving the replica of the data block from one of the plurality of nodes based on the determined distances.

7. The method of claim 1, further comprising:
   detecting the first node storing the first replica of the data block has an over-utilized state;
   determining a target node from a plurality of nodes having an under-utilized state based on the target node being associated with the same first node group associated with the first node; and
   transferring the first replica of the data block from the first node to the target node.

8. The method of claim 1, further comprising:
   assigning a task for processing the data block to a compute node based on a node group of the compute node, wherein the node group of the compute node is the same as at least one of the first node group and the second node group.

9. A method for processing data in a distributed computing system having a plurality of virtual machines executing on a plurality of host computers arranged in a plurality of racks, the method comprising:
   dividing an input data set into a plurality of data blocks;
   storing the plurality of data blocks in a first plurality of nodes executing in a plurality of virtual machines (VMs), wherein each of the first plurality of nodes is associated with a node group comprising one or more of the plurality of VMs executing on a same host computer;
   generating a plurality of tasks to process the plurality of data blocks in parallel, wherein a first task of the plurality of tasks operates on a corresponding one of the plurality of data blocks; and
   assigning the plurality of tasks to a second plurality of nodes executing in the plurality of VMs based on a network topology of the plurality of VMs, the plurality of host computers, and the plurality of racks.

10. The method of claim 9, wherein the first task is assigned to a first node comprising at least one of: (1) a node local to a second node storing the corresponding data block, (2) a node having a same node group as the second node storing the corresponding data block, (3) a node disposed in a same rack as the second node storing the corresponding data block, and (4) a node disposed in a different rack as the second node storing the corresponding data block.

11. The method of claim 9, wherein assigning the plurality of tasks to the second plurality of nodes further comprises:
    scheduling the plurality of tasks according to the network topology and an order of preference comprising a local node, a local node group, a local rack, and a remote rack.

12. A non-transitory computer-readable storage medium comprising instructions that, when executed in a computing device, store data in a virtualized computing system comprising a plurality of virtual machines executing on a plurality of host computers arranged in a plurality of interconnected racks by performing the steps of:
    storing a first replica of a data block at a first node executing in a first virtual machine (VM) and associated with a first node group, wherein the first node group comprises a plurality of virtual machines (VMs) that includes the first VM executing on a same first host computer;
    determining a second node for storing a second replica of the data block based on the first node group of the first node, wherein the second node is associated with a second node group different from the first node group; and
    storing the second replica of the data block at the determined second node.

13. The non-transitory computer-readable storage medium of claim 12, wherein storing the first replica of the data block at the first node further comprises instructions for:
    receiving a write request for the data block from a process executing in a client VM, wherein the client VM is part of the plurality of VMs comprising the first node group; and
    responsive to determining no node local to the client VM is available for storing the data block, selecting the first node for storing the first replica based on the first VM and the client VM are members of the same first node group.

14. The non-transitory computer-readable storage medium of claim 12, wherein the second node is executing in a second VM, wherein the second node group comprise a second plurality of VMs that includes the second VM executing on a second host computer different from the first host computer.

15. The non-transitory computer-readable storage medium of claim 14, wherein the first host computer is disposed in a first rack, wherein the second host computer is associated with a second rack different from the first rack, wherein the method further comprises:
    determining a third node for storing a third replica of the data block based on the third node executing on a third host computer disposed in the same second rack as the second host computer, and further based on the third node executing on a different host computer than the second node.

16. The non-transitory computer-readable storage medium of claim 12, further comprising instructions for:
 receiving a read request for the data block from a process executing in a client VM;
 determining a distance between the client VM and each of a plurality of nodes, including the first node and the second node, that stores a replica of the data block, wherein the distance between the client VM and the first node is determined based on a network topology comprising the first VM on which the first node is executing, the first host computer on which the first VM is executing, and the first rack in which the first host computer is arranged; and
 retrieving the replica of the data block from one of the plurality of nodes based on the determined distances.

17. The non-transitory computer-readable storage medium of claim 12, further comprising instructions for:
 detecting the first node storing the first replica of the data block has an over-utilized state;
 determining a target node from a plurality of nodes having an under-utilized state based on the target node being associated with the same first node group associated with the first node; and
 transferring the first replica of the data block from the first node to the target node.

18. The non-transitory computer-readable storage medium of claim 12, further comprising instructions for:
 assigning a task for processing the data block to a compute node based on a node group of the compute node, wherein the node group of the compute node is the same as at least one of the first node group and the second node group.

19. A non-transitory computer-readable storage medium comprising instructions that, when executed in a computing device, for processing data in a distributed computing system having a plurality of virtual machines executing on a plurality of host computers arranged in a plurality of racks, by performing the steps of:
 dividing an input data set into a plurality of data blocks;
 storing the plurality of data blocks in a first plurality of nodes executing in a plurality of virtual machines (VMs), wherein each of the first plurality of nodes is associated with a node group comprising one or more of the plurality of VMs executing on a same host computer;
 generating a plurality of tasks to process the plurality of data blocks in parallel, wherein a first task of the plurality of tasks operates on a corresponding one of the plurality of data blocks; and
 assigning the plurality of tasks to a second plurality of nodes executing in the plurality of VMs based on a network topology of the plurality of VMs, the plurality of host computers, and the plurality of racks,
 wherein the first task is assigned to a first node comprising at least one of: (1) a node local to a second node storing the corresponding data block, (2) a node having a same node group as the second node storing the corresponding data block, (3) a node disposed in a same rack as the second node storing the corresponding data block, and (4) a node disposed in a different rack as the second node storing the corresponding data block.

20. The non-transitory computer-readable storage medium of claim 19, wherein assigning the plurality of tasks to the second plurality of nodes further comprises:
 scheduling the plurality of tasks according to the network topology and an order of preference comprising a local node, a local node group, a local rack, and a remote rack.

* * * * *